United States Patent
Ose

(12) 
(10) Patent No.: US 6,453,766 B1
(45) Date of Patent: Sep. 24, 2002

(54) FORCE TRANSFER MECHANISM FOR A BICYCLE TRANSMISSION CONTROL CABLE

(75) Inventor: Kenji Ose, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/196,210

(22) Filed: Nov. 20, 1998

(51) Int. Cl.⁷ .............................................. G05G 1/08
(52) U.S. Cl. ..................... 74/505; 74/502.2; 74/506; 74/473.14; 74/473.15; 74/489; 116/28.1
(58) Field of Search ........................... 74/501.5 R–506, 74/489, 473.14, 480, 473.15; D12/178, 114; 116/28.1, 317

(56) References Cited

U.S. PATENT DOCUMENTS

| | | | |
|---|---|---|---|
| 1,650,336 A | 11/1927 | Farmer | |
| 2,737,822 A | 3/1956 | Morse | 74/222 |
| 2,796,140 A | 6/1957 | Knolle | 180/12 |
| 3,008,343 A | 11/1961 | Walsey | 74/501 |
| 3,403,577 A | 10/1968 | Ozaki | 74/480 |
| 3,524,979 A * | 8/1970 | Cohen | 240/2 |
| B16,199,446 B1 * | 8/1970 | Ose | 74/502.2 |
| 3,633,437 A | 1/1972 | Ishida | 74/489 |
| 3,665,775 A | 5/1972 | Freeman | 74/473 R |
| 3,683,716 A * | 8/1972 | Anderson | 74/489 X |
| 3,800,614 A | 4/1974 | Johnson | 74/473 R |
| 3,861,234 A | 1/1975 | Cristie | 74/480 R |
| 3,874,248 A | 4/1975 | Hauser et al. | 74/475 |
| 4,016,838 A * | 4/1977 | Yoshioka et al. | 74/471 R X |
| 4,245,522 A | 1/1981 | Robinson | 74/480 R |
| 4,304,145 A | 12/1981 | Shimano | 74/480 R |
| 4,320,673 A * | 3/1982 | Wegert | 71/501 R X |
| 4,461,189 A * | 7/1984 | Rottenkolber et al. | 74/489 |
| 4,611,561 A | 9/1986 | Suyama | 123/360 |
| 4,703,823 A * | 11/1987 | Yogo et al. | 180/197 |
| 4,840,080 A * | 6/1989 | Kobayashi et al. | 74/501.5 R |
| 4,848,502 A | 7/1989 | Kikuta et al. | 180/179 |
| 4,895,224 A * | 1/1990 | Sugihara | 188/24.14 |
| 4,900,291 A | 2/1990 | Patterson | 474/80 |
| 4,938,304 A * | 7/1990 | Yamaguchi et al. | 180/197 |
| 5,020,387 A | 6/1991 | Nagano | 74/475 |
| 5,178,033 A * | 1/1993 | Kund | 74/501.5 R |
| 5,197,927 A | 3/1993 | Patterson et al. | 474/80 |
| 5,429,012 A | 7/1995 | Ikeda et al. | 74/475 |
| 5,438,889 A | 8/1995 | Tagawa | |
| 5,458,018 A | 10/1995 | Kawakami | 74/502.2 |
| 5,481,934 A | 1/1996 | Tagawa | 74/475 |
| 5,540,304 A * | 7/1996 | Hawkins et al. | 188/24.15 |
| D372,893 S * | 8/1996 | Harris | D12/178 |
| 5,621,382 A * | 4/1997 | Yamamoto | D12/114 X |
| 5,673,594 A | 10/1997 | Huang et al. | 74/475 |
| 5,732,598 A | 3/1998 | Shoge et al. | 74/475 |
| 5,758,546 A * | 6/1998 | Taomo et al. | 74/502.2 X |
| 5,768,945 A | 6/1998 | Ose | 74/489 |

(List continued on next page.)

FOREIGN PATENT DOCUMENTS

| | | |
|---|---|---|
| DE | 2921923 | 12/1980 |
| DE | 3534882 A1 | 4/1987 |
| DE | 29603500 U1 | 7/1996 |

(List continued on next page.)

OTHER PUBLICATIONS

U.S. patent application, 08/995,276; filed Dec. 19, 1997.

*Primary Examiner*—Vinh T. Luong
(74) *Attorney, Agent, or Firm*—James A. Deland

(57) ABSTRACT

A force transfer unit is provided for engaging a control cable connected to a hand operated shift control unit. The force transfer unit includes a handlebar attachment member and a cable diverting member for changing a direction of the control cable, wherein the force transfer unit is separate from the shift control unit. A gear indicator may be formed with the force transfer unit or instead of the force transfer unit so that the gear indicator may be located remotely from the shift control unit.

103 Claims, 5 Drawing Sheets

U.S. PATENT DOCUMENTS

| | | | |
|---|---|---|---|
| 5,813,282 A | * | 9/1998 | Azuma .................... 74/506 X |
| 5,845,537 A | * | 12/1998 | Campagnolo ............. 74/506 X |
| 5,903,214 A | | 5/1999 | Watarai |
| 5,921,139 A | | 7/1999 | Yamane .................. 74/473.13 |
| 6,106,067 A | * | 8/2000 | Zhuang et al. ........... 297/361.1 |
| 6,295,888 B1 | * | 10/2001 | Watarai .................... 74/502.2 |

FOREIGN PATENT DOCUMENTS

| | | |
|---|---|---|
| EP | 585473 A1 | 3/1984 |
| EP | 647556 A2 | 4/1995 |
| EP | 719701 | 7/1996 |
| EP | 849157 A2 A3 | 6/1998 |
| EP | 878387 A2 A3 | 11/1998 |
| FR | 2654698 | 5/1991 |
| JP | 57-117738 | 2/1982 |
| JP | 60-23273 | 7/1985 |
| JP | 61-5348 | 2/1986 |
| JP | 5-319355 | 12/1993 |
| JP | 8-337193 | 12/1996 |
| WO | 98/42530 | 10/1998 |

* cited by examiner

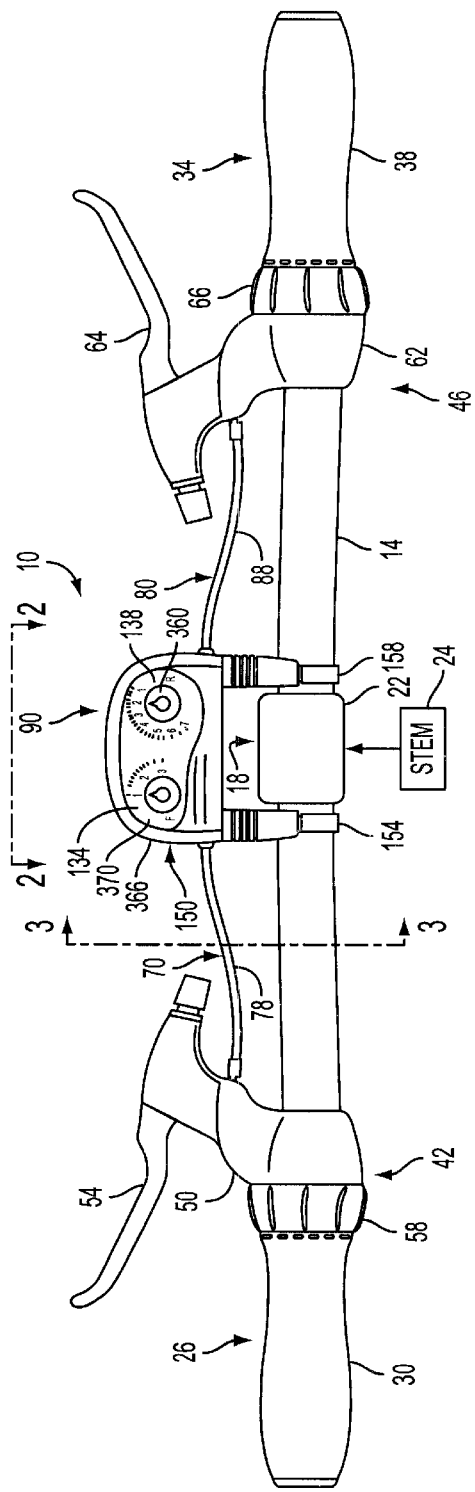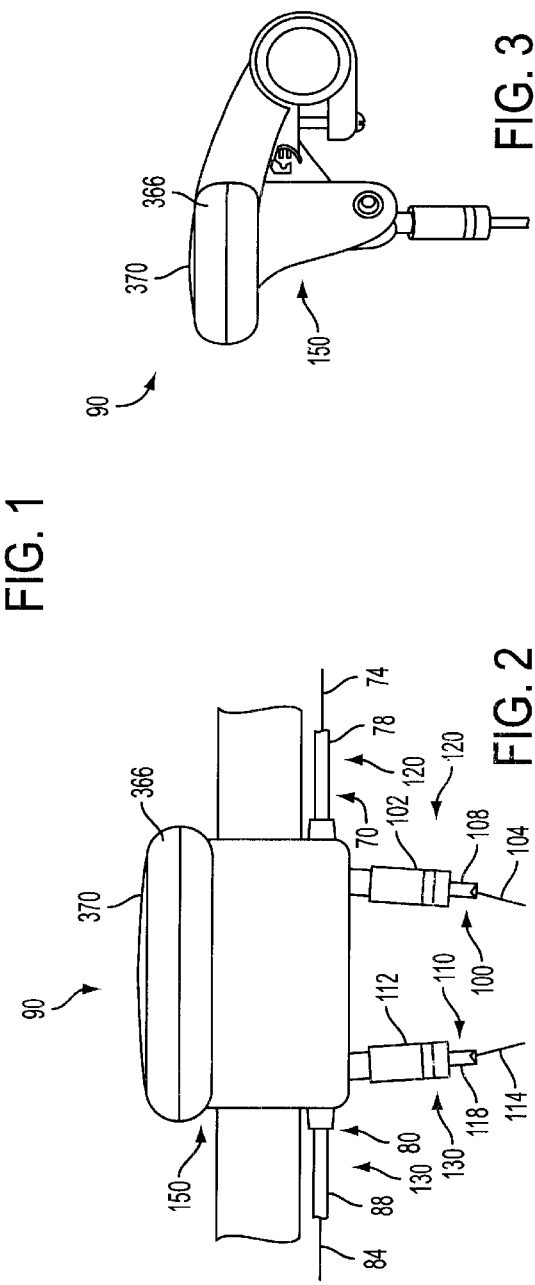

FORCE TRANSFER MECHANISM FOR A BICYCLE TRANSMISSION CONTROL CABLE

BACKGROUND OF THE INVENTION

The present invention is directed to control devices for bicycle transmissions and, more particularly, to a force transfer mechanism for a bicycle transmission control cable.

Bicycle transmissions are commonly controlled by a manually operated shift control unit that includes a lever or ring that is rotated by the rider. The shift control unit is connected to a control cable of the type having an inner wire that slides within a tubular outer casing, wherein one end of the inner wire is connected to the shift control unit, and the other end of the inner wire is connected to the bicycle transmission. The transmission may be a derailleur or internal hub transmission, wherein operation of the shift control unit selectively pulls or releases the inner wire to change gears in the transmission. Such transmissions are usually located at the pedal cranks (a front transmission) and/or the rear wheel (a rear transmission). Bicycles operated with derailleurs, by the far the most common types of bicycle transmission, usually have both front-and rear transmissions. With such bicycles the shift control unit for the front transmission is usually mounted at the left gripping end of the handlebar, and the shift control unit for the rear transmission is usually mounted at the right gripping end of the handlebar.

Typical shift control units usually include a pulley which winds or unwinds the inner wire in response to rotation of the manually operated lever or ring. The cable winding groove on the pulley may have various configurations such as circular, increasing radius, decreasing radius, etc. to produce a rate of pulling or releasing of the inner wire to accommodate the gear shifting motion characteristics of the transmission. As a result, different shift control units usually must be made to accommodate different transmissions.

Additionally, some shift control units have a gear indicator for indicating the current gear position of the bicycle transmission. Some gear indicators take the form of a disc or needle that rotates in repose to rotation of the pulley. Other gear indicators are simple markings on the manually operated lever or ring that move relative to a stationary scale on the shift control unit housing. In any case, the gear indicator is located with the shift control unit housing. Consequently, since the shift control units are usually mounted at the opposite gripping ends of the handlebar, the rider must divert his or her view from the road or trail and look to the opposite ends of the handlebar to ascertain the currently selected gears. This is very inconvenient, especially during races since full awareness of the race course and nearby riders is required to win the race.

SUMMARY OF THE INVENTION

The present invention is directed to a force transfer unit for a bicycle transmission which can be used with multiple types of shift control devices and/or which allows the rider to ascertain the gear position or state of one or more bicycle transmissions while looking straight ahead. In one embodiment of the present invention, a force transfer unit is provided for engaging a control cable connected to a hand operated shift control unit. The force transfer unit includes a handlebar attachment member and a cable diverting member for changing a direction of the control cable, wherein the force transfer unit is separate from the shift control unit. In a more specific embodiment, the cable diverting member takes the form of a pulley, wherein a cable winding groove of the pulley has the appropriate shape to accommodate the cable pulling requirements of the shift control device. Thus, the force transmission mechanism can be used with different types of shift control units, and shift control units having different cable pulling requirements can be accommodated merely by changing the pulley in the force transfer unit. The force transfer unit can be placed in a convenient place such as the central portion of the handlebar. With this configuration the control cable may extend conveniently from the shift control unit parallel to the handlebar and then be diverted to extend parallel to the bicycle frame.

In another embodiment, the force transfer unit may include a gear indicator for indicating a current gear of the bicycle transmission. If the force transmission unit is mounted in the central portion of the handlebar, then the rider can ascertain the current gear of the bicycle transmission without having to look to the ends of the handlebar. This is especially convenient when the force transfer unit is used with combined front and rear bicycle transmissions.

BRIEF DESCRIPTION OF THE DRAWINGS

FIG. 1 is a top view of a particular embodiment of a bicycle shift control apparatus according to the present invention;

FIG. 2 is a view taken along line 2—2 in FIG. 1;

FIG. 3 is a view taken along line 3—3 in FIG. 1;

DETAILED DESCRIPTION OF THE EMBODIMENTS

Figure 4:
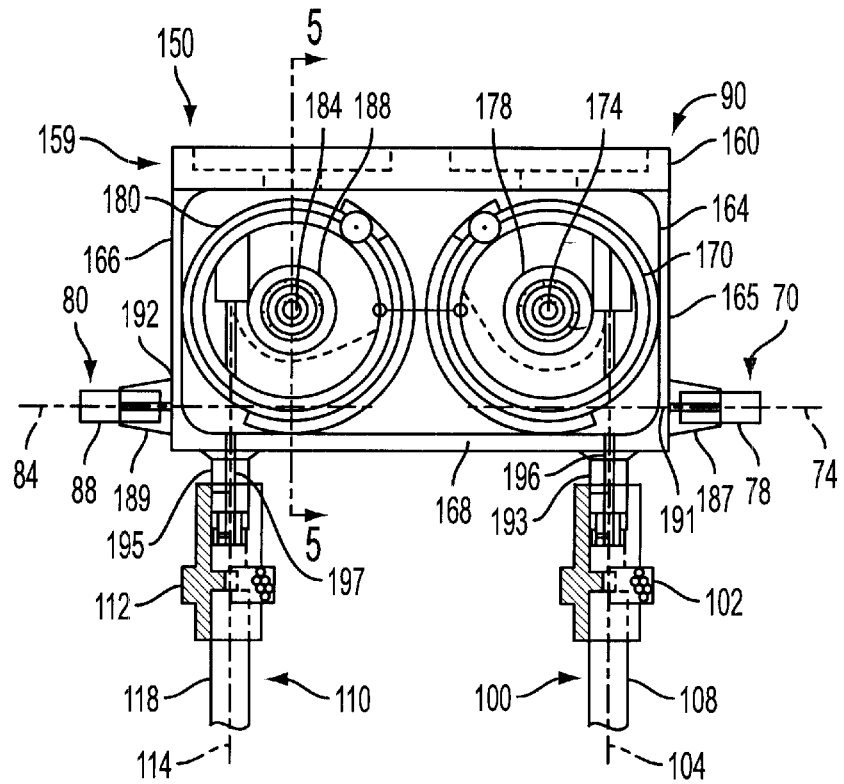
FIG. 4 is a front cutaway view of the force transfer unit shown in FIG. 1.

FIG. 1 is a top view of a particular embodiment of a bicycle shift control apparatus 10 according to the present invention attached to a handlebar 14. Handlebar 14 includes a central portion 18 fitted within a sleeve 22 attached to a conventional handlebar stem 24, a left grip section 26 covered with a rubber or foam grip 30, and a right grip section 34 covered with a rubber or foam grip 38. A hand operated shift control unit 42 for controlling a front transmission such as an internal crank hub or derailleur transmission is mounted to handlebar 14 in close proximity to left grip section 26, and a hand operated shift control unit 46 for controlling a rear transmission such as an internal wheel hub or derailleur transmission is mounted to handlebar 14 in close proximity to right grip section 34.

Shift control unit 42 includes a housing 50 supporting a brake lever 54 and a ring-shaped actuator 58, and shift control unit 46 includes a housing 62 supporting a brake lever 64 and a ring-shaped actuator 66. Shift control unit 42 is coupled to a control cable segment 70 having an inner wire 74 (FIG. 2) that slides within a tubular outer casing 78 such that rotation of actuator 58 selectively pulls and releases inner wire 74 to shift gears in the front bicycle transmission. Similarly, shift control unit 46 is coupled to a control cable segment 80 having an inner wire 84 (FIG. 2) that slides within a tubular outer casing 88 such that rotation of actuator 66 selectively pulls and releases inner wire 84 to shift gears in the rear bicycle transmission. In this embodiment, shift control units 42 and 46 are indexed shift control units that may be constructed according to the teachings of U.S. Pat. No. 5,921, 139 issued on Jul. 13, 1999 and incorporated herein by reference. Of course, twist-grip bicycle transmission shift control units are very old and well known, so shift control units 42 and 46 may be constructed in many different ways and need not be indexed.

Control cable segments 70 and 80 are coupled to shift control units 42 and 46, respectively, extend parallel to handlebar 14 and are coupled to a force transmission unit 90. Force transmission unit 90 is further coupled to control cable segments 100 and 110 via conventional cable adjustment barrels 102 and 112, respectively, wherein control cable segment 100 has an inner wire 104 that slides within an outer casing 108, and control cable segment 110 has an inner wire 114 that slides within an outer casing 118. Cable adjustment barrels 102 and 112 also function as outer casing stops for terminating outer casings 108 and 118 of control segments 100 and 110, respectively. Control cable segments 70 and 100 are segments of an overall control cable 120, and control cable segments 80 and 110 are segments of an overall control cable 130. As discussed more fully below, force transmission unit 90 changes the direction of control cable 120 from the horizontal orientation of control cable segment 70 to the vertical orientation of control cable segment 100 with or without changing the rotational characteristics of shift control unit 42. Similarly, force transmission unit 90 changes the direction of control cable 130 from the horizontal orientation of control cable segment 80 to the vertical orientation of control cable segment 110 with or without changing the rotational characteristics of shift control unit 46. At the same time, force transmission unit 90 includes a front gear indicator 134 for indicating a state of the front transmission and a rear gear indicator 138 for indicating a state of the rear transmission.

Figure 5:
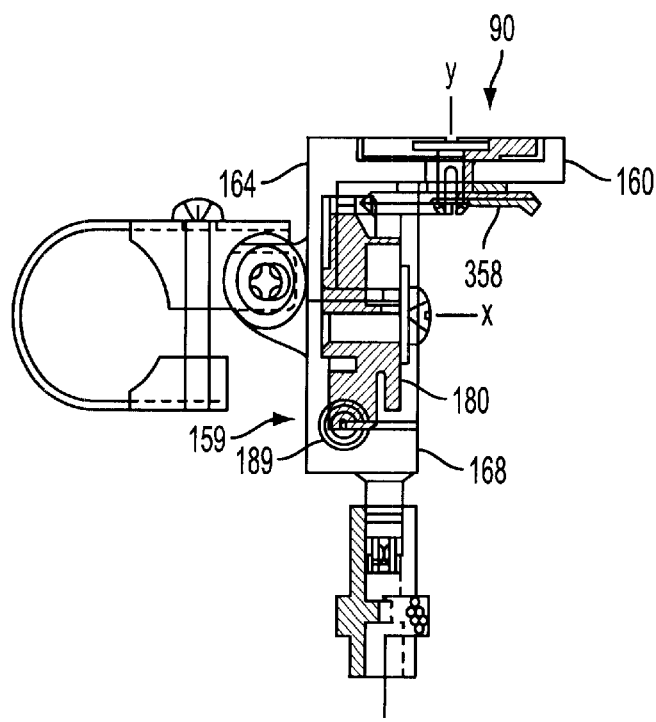
FIG. 5 is a view taken along line 5—5 in FIG. 4.
Figure 6:
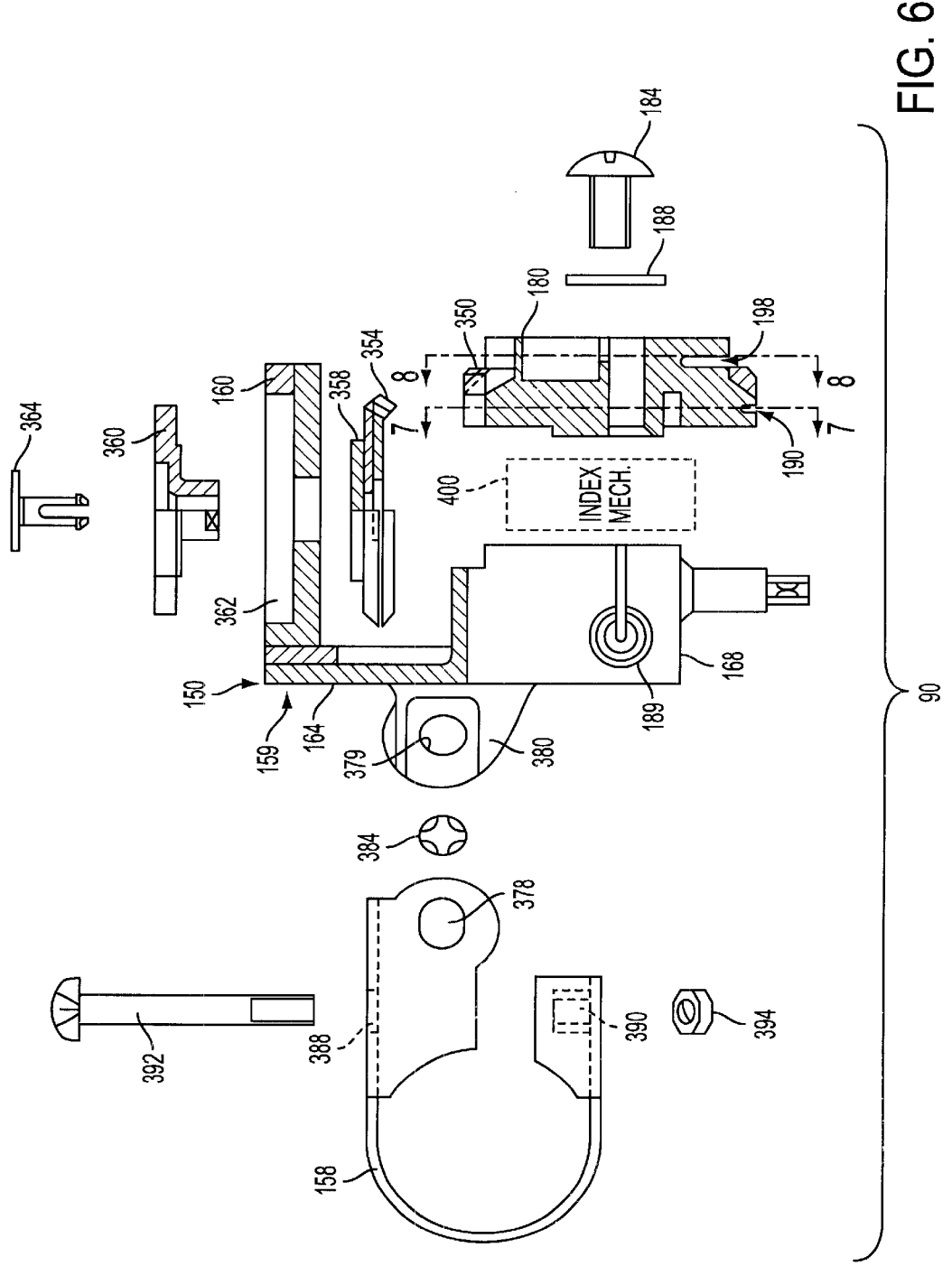
FIG. 6 is an exploded view of the force transfer mechanism shown in FIG. 5.

As shown in FIG. 1, force transmission unit 90 includes a mounting member in the form of a housing 150, a first handlebar attachment member 154 which attaches force transmission unit 90 to handlebar 14 on the left side of sleeve 22, and a second handlebar attachment member 158 which attaches force transmission unit 90 to handlebar 14 on the right side of sleeve 22. In this embodiment, first handlebar attachment member 154 is substantially parallel to second handlebar attachment member 158. As shown in FIGS. 4–6, housing 150 includes a housing wall 159 including an upper wall 160, a rear wall 164, a first side wall 165, a second side wall 166 opposite first side wall 165, and a bottom (intermediate) wall 168. A cable diverting member in the form of a pulley 170 is rotatably mounted to rear wall 164 through a pivot bolt 174 and washer 178, and a cable diverting member in the form of a pulley 180 is rotatably mounted to rear wall 164 through a pivot bolt 184 and washer 188. Outer casing stops 187 and 189 aligned with first and second cable passages 191 and 192, respectively, are disposed on first and second side walls 165 and 166 for terminating outer casings 78 and 88 of control cable segments 70 and 80, respectively. Adjustment barrel interfaces 193 and 195 defining third and fourth cable passages 196 and 197 through bottom wall 168 are provided for attaching cable adjustment barrels 102 and 112, respectively. When considering the provisions for cable entry, outer casing stop 187 may be considered a first outer casing stop, and outer casing stop 189 may be considered a second outer casing stop. However, when considering the entire device, then outer casing stop 187 may be considered a first outer casing stop, cable adjustment barrel 102 may be considered a second outer casing stop, outer casing stop 189 may be considered a third outer casing stop, and cable adjustment barrel 112 may be considered a fourth outer casing stop.

Figure 7:
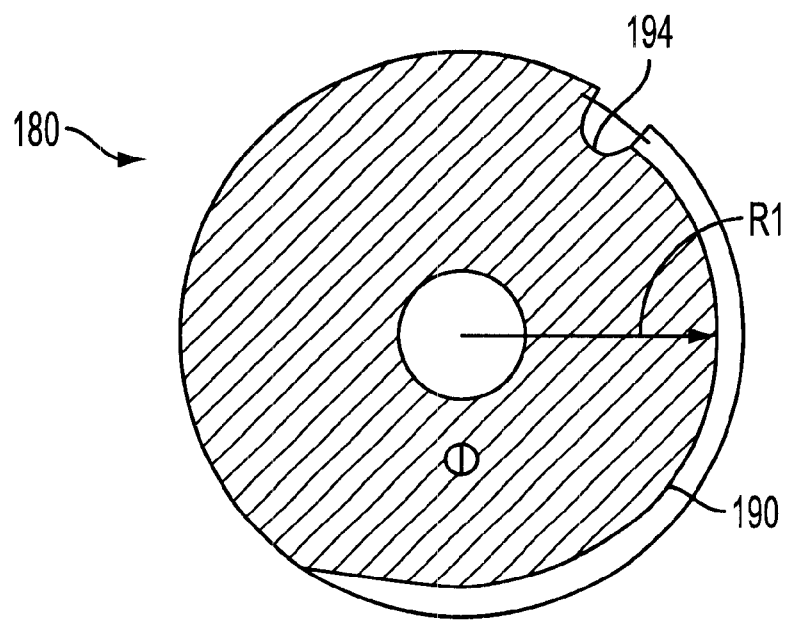
FIG. 7 is a view taken along line 7—7 in FIG. 6.
Figure 8:
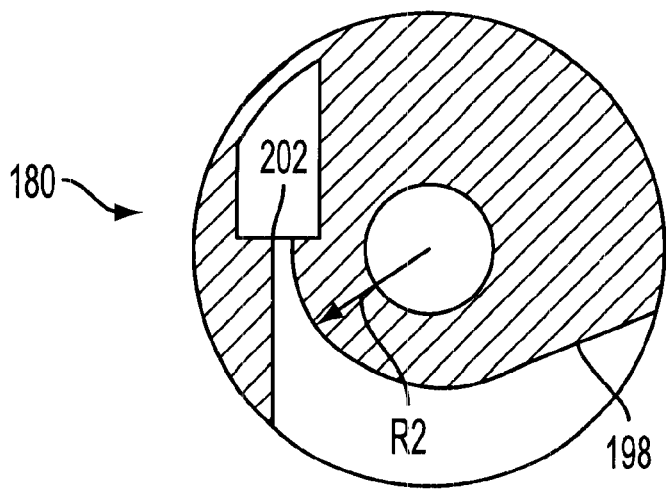
FIG. 8 is a view taken along line 8—8 in FIG. 6

In this embodiment, pulleys 170 and 180 have the same general structure, so only the details of pulley 180 shall be described in detail. As seen more clearly in FIGS. 6–8, pulley 180 includes a first cable winding groove 190 that functions as a cable diverting surface having a substantially constant radius of curvature R1 for winding inner wire 84 of control cable segment 80, a first cable attachment location or stop 194 for supporting a conventional cable end bead (not shown) attached to inner wire 84, a second cable winding groove 198 having a substantially constant radius of curvature R2 (at least for the portions that actually wind the cable) that functions as a cable diverting surface for winding inner wire 114 of control cable segment 110, and a second cable attachment location or stop 202 for supporting a conventional cable end bead (not shown) attached to inner wire 114. In general, the radius of curvature R2 is less than the radius of curvature R1 to "step down" the rate of cable pull per unit rotation of actuator 66 for rear derailleurs that have a high actuating ratio. Radius of curvature R2 could be less than radius of curvature R1 in derailleurs with a low actuation ratio, and either radius of curvature RI or R2 could be variable for derailleurs with a variable actuation ratio as is well-known for four-bar-link-type derailleurs.

Figure 9:
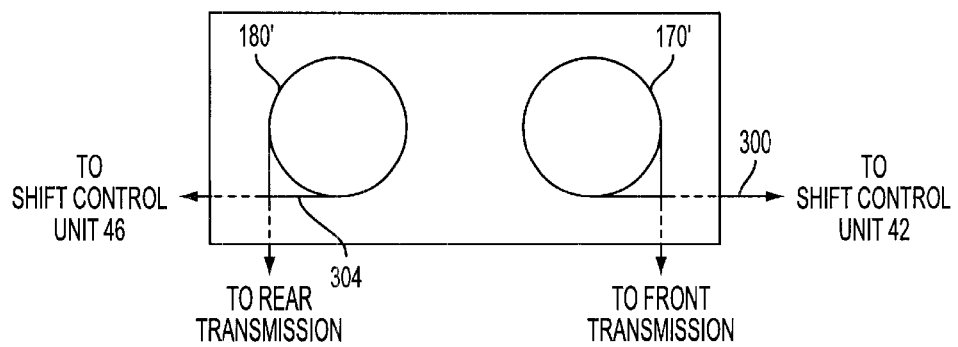
FIG. 9 is a schematic view of an alternative embodiment of pulleys and cables according to the present invention.
Figure 10:
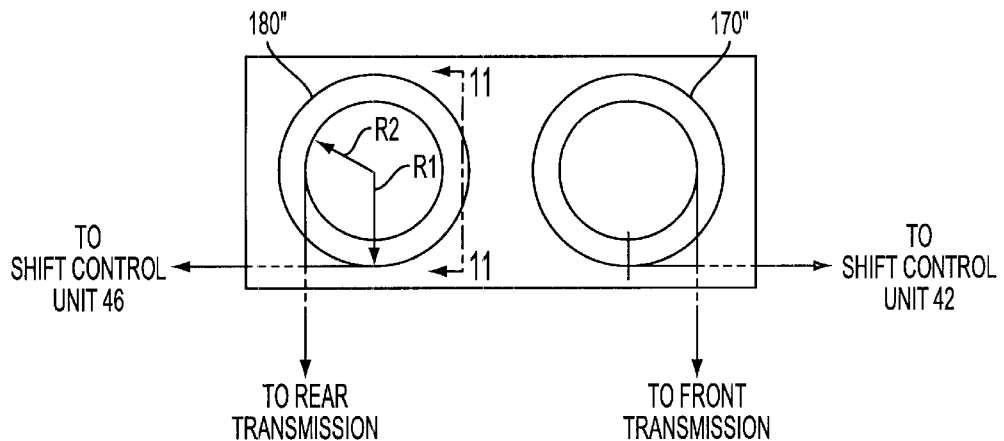
FIG. 10 is a schematic view of another embodiment of pulleys and cables according to the present invention.
Figure 11:
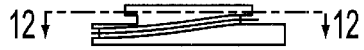
FIG. 11 is a view taken along line 11—11 in FIG. 10.
Figure 12:
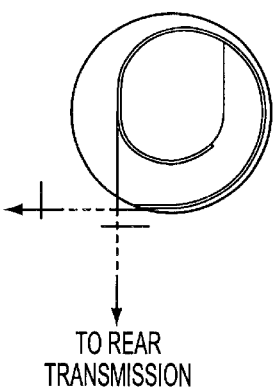
FIG. 12 is a view taken along line 12—12 in FIG. 11.

FIGS. 9–12 are schematic views of alternative embodiments of pulleys and cables that may be used in a force transfer unit according to the present invention. In the embodiment shown in FIGS. 4–8, each control cable was made from two control cable segments having two inner wires. In the embodiments shown in FIGS. 9–11, each control cable has only one inner wire, although there will still be two outer casing segments that attach to the housing as in the embodiment shown in FIGS. 4–8. More specifically, FIG. 9 shows an embodiment wherein pulleys 170' and 180' have a single spiral cable winding groove such that inner wires 300 and 304 wind around each pulley by approximately 270°. The radius of curvature of each winding groove is substantially constant and produce a 1:1 actuation ratio. Although the net diversion of each cable is only approximately 90°, having the cables 300 and 304 wind by approximately 270° ensures firm engagement between cables 300 and 304 and their respective pulleys 170' and 180'. Also, a 270° winding allows each cable 300 and 304 to enter and exit housing 150 at the bottom so that it appears to the user that the cable makes a very sharp 90° turn. FIGS. 10–12 show an embodiment wherein the input radius if curvature R1 of pulleys 170" and 180" is greater than the output radius of curvature R2. The effect is substantially the same as in the first embodiment. The same scheme could be used to increase the radius of curvature from input to output as where radius R2 is the input radius and radius R1 is the output radius.

As shown further in FIGS. 5 and 6, pulley 180 has a bevel tooth gear 350 on an outer peripheral surface thereof for meshing with a complementary bevel tooth gear 354 disposed on the outer peripheral surface of an indicator transfer gear 358. Indicator transfer gear 358 is fixed to an indicator disk 360 through a removable fastener 364 so that indicator disk 360 rotates together with indicator transfer gear 358. As shown in FIG. 5, pulley 180 rotates around a pulley axis X that is substantially perpendicular to a rotational indicator axis Y of indicator disk 360 so as to provide for a very compact structure.

In this embodiment, indicator disk 360 is fitted within a recess 362 in upper wall 160. Indicator disk 360 has an indicating needle formed or printed thereon which cooperates with gear indicia formed or printed on the housing to form rear gear indicator 138 as shown in FIG. 1. A similar transfer gear and indicator disk (not shown) mesh with pulley 170 to form front gear indicator 134, and a cover 366 (FIG. 1) having a viewing window 370 is placed over the top wall 160 to protect the indicators 134 and 138 from the elements.

As shown in FIG. 6, handlebar attachment member 158 is a U-shaped member having an opening 378 which aligns with an opening 379 in a mounting flange 380 on housing 150. A mounting bolt 384 extends through openings 378 and 379 and engages with a nut (not shown) for attaching handlebar attachment member 158 to housing 150. The orientation of handlebar attachment member 158 relative to housing 150 may be adjusted by loosening bolt 384, setting the desired relative positions of the two members and retightening the bolt. Handlebar attachment member 158 also includes openings 388 and 390 for receiving a fastener 392 therethrough. Fastener 392 screws into a nut 394 which nonrotatably fits within opening 390 so that handlebar attachment member 158 may clamp to the handlebar 14. The orientation of handlebar attachment member 158 relative to handlebar 14 may be adjusted by loosening bolt 392, setting the desired relative positions of the two members and retightening the bolt. Handlebar attachment member 154 is constructed the same way.

It should be readily apparent from the foregoing description that force transfer unit 90 can be used with any desired shift control unit merely by changing the pulleys 170 and 180 to accommodate the different shifting characteristics of the shift control unit. The force transfer mechanism allows the control cables to neatly run along the handlebar and then along the main bicycle frame to their respective transmissions. Also, since the force transfer unit 90 is mounted on the center of the handlebar, the gear indicators 134 and 138 may be easily viewed by the rider without having to look to the opposite sides of the handlebar.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Thus; while force transfer unit 90 was mounted at the center of the handlebar, force transfer unit could be mounted anywhere on the handlebar as long as it is spaced apart from at least one of the shift control units. The rotational axes X and Y for the pulleys need not be perpendicular to each other, and the pulleys may be placed above and below each other (e.g., vertically aligned with the handlebar stem) rather than being horizontally aligned to the left and right of each other as shown in FIG. 4.

An optional indexing mechanism 400 may be disposed with one or more of the pulleys as shown by the broken lines in FIG. 6. Such indexing mechanisms are very well known and will not be described in detail. Alternatively, such an indexing mechanism may be disposed with the indicator transfer gears. The direction of rotation of the indicator disks may be reversed by reversing the direction of winding of the inner wire around pulley 170 and/or pulley 180.

A gear indicator may be formed with the force transfer unit or by itself so that the gear indicator may be located remotely from the shift control unit. In the latter case the inner wires of the control cables would terminate at the pulleys, for example, by omitting second control cable segments 100 and 110 in the embodiments shown in FIGS. 4–8, by having the inner wires wind around the indicator transfer gears, or by some other method.

Clearly, many obvious modifications can be made to the described embodiments. Thus, the scope of the invention should not be limited by the specific structures disclosed. Instead, the true scope of the invention should be determined by the following claims.

What is claimed is:

1. A force transfer unit for engaging a control cable having an inner wire that slides within an outer casing and that is connected to a hand operated shift control unit for controlling a bicycle transmission, the force transfer unit comprising:

a first attachment member for attaching the force transfer unit to a bicycle;

a mounting member coupled to the first attachment member;

a first outer casing stop disposed on the mounting member;

a second outer casing stop disposed on the mounting member;

a cable diverting member disposed on the mounting member and having a cable diverting surface for receiving the inner wire thereover to thereby bend the, inner wire over the cable diverting surface as the inner wire passes over the cable diverting surface during use, wherein the force transfer unit is separate from the shift control unit; and a gear indicator operatively coupled to the mounting member for operatively coupling to the inner wire, wherein the gear indicator moves in response to movement of the inner wire for indicating a gear position of the bicycle transmission.

2. The force transfer unit according to claim 1 wherein the second outer casing stop comprises a cable adjustment barrel.

3. The force transfer unit according to claim 1 wherein the mounting member includes a first side wall and a second side wall opposite the first side wall, wherein the first outer casing stop is disposed on the first side wall, and wherein the second outer casing stop is disposed on the second side wall.

4. The force transfer unit according to claim 1 wherein the gear indicator indicates a gear position of a front bicycle transmission.

5. The force transfer unit according to claim 1 wherein the gear indicator indicates a gear position of a rear bicycle transmission.

6. The force transfer unit according to claim 1 wherein the gear indicator has a disc shape.

7. A force transfer unit for engaging a control cable having an inner wire that slides within an outer casing and that is connected to a hand operated shift control unit for controlling a bicycle transmission, the force transfer unit comprising:

a first attachment member for attaching the force transfer unit to a bicycle;

a mounting member coupled to the first attachment member;

a first outer casing stop disposed on the mounting member;

a second outer casing stop disposed on the mounting member;

a cable diverting member disposed on the mounting member and having a cable diverting surface for receiving the inner wire thereover to thereby change a direction of the inner wire as the inner wire passes over the cable diverting surface, wherein the force transfer unit is separate from the shift control unit;

a gear indicator operatively coupled to the mounting member and to the cable diverting member, wherein the gear indicator moves in response to movement of the inner wire for indicating a gear position of the bicycle transmission; and wherein the cable diverting member comprises a pulley.

8. The force transfer unit according to claim 7 wherein the pulley has a cable winding groove.

9. The force transfer unit according to claim 8 wherein the cable winding groove has a helical shape and extends approximately 270° around the pulley.

10. The force transfer unit according to claim 8 wherein the cable winding groove has a constant radius of curvature.

11. The force transfer unit according to claim 8 wherein the cable winding groove has a varying radius of curvature.

12. The force transfer unit according to claim 7 wherein the pulley includes:

a first cable attachment location for attaching a first cable segment; and a second cable attachment location for attaching a second cable segment.

13. The force transfer unit according to claim 7 further comprising a second attachment member for attaching the force transfer unit to the bicycle.

14. The force transfer unit according to claim 13 wherein the first attachment member is substantially parallel to the second attachment member.

15. The force transfer unit according to claim 7 wherein the gear indicator moves in response to rotation of the pulley.

16. The force transfer unit according to claim 15 wherein the pulley rotates around a pulley axis, wherein the gear indicator rotates around an indicator axis, and wherein the pulley axis is substantially perpendicular to the indicator axis.

17. The force transfer unit according to claim 7 further comprising an indexing mechanism for setting a position of the pulley in a plurality of positions.

18. A force transfer unit for engaging first and second control cables connected to respective first and second hand operated shift control units, wherein the first control cable has a first inner wire that slides within a first outer casing and the second control cable has a second inner wire that slides within a second outer casing, the force transfer unit including:

a housing separate from the first and second shift control units, wherein the housing has a housing wall including a first cable passage extending through the housing wall, a second cable passage extending through the housing wall, a third cable passage extending through the housing wall, and a fourth cable passage extending through the housing wall, and wherein the first cable passage, the second cable passage and the third cable passage are spaced apart from each other;

an attachment member coupled to the housing for coupling the housing to a bicycle;

a first cable diverting member disposed in the housing for changing a direction of the first control cable; and a second cable diverting member disposed in the housing for changing a direction of the second control cable.

19. The force transfer unit according to claim 18 further comprising:

a first outer casing stop disposed on the housing wall; and a second outer casing stop disposed on the housing wall.

20. The force transfer unit according to claim 19 further comprising:

a third outer casing stop disposed on the housing wall; and a fourth outer casing stop disposed on the housing wall.

21. The force transfer unit according to claim 19 wherein the housing wall includes a first side wall and a second side wall opposite the first side wall, wherein the first outer casing stop is disposed on the first side wall, and wherein the second outer casing stop is disposed on the second side wall.

22. The force transfer unit according to claim 21 further comprising:

a third outer casing stop disposed on the housing wall; and a fourth outer casing stop disposed on the housing wall.

23. The force transfer unit according to claim 19 wherein the housing wall includes a first side wall, a second side wall opposite the first side wall and an intermediate wall extending between the first side wall and the second side wall, wherein the first outer casing stop is disposed on the first side wall, and wherein the second outer casing stop is disposed on the intermediate wall.

24. The force transfer unit according to claim 23 wherein the second outer casing stop comprises a cable adjustment barrel.

25. The force transfer unit according to claim 23 further comprising:

a third outer casing stop disposed on the housing wall; and a fourth outer casing stop disposed on the housing wall.

26. The force transfer unit according to claim 25 wherein the third outer casing stop is disposed on the second side wall, and wherein the fourth outer casing stop is disposed on the intermediate wall.

27. The force transfer unit according to claim 26 wherein the second outer casing stop comprises a first cable adjustment barrel, and wherein the fourth outer casing stop comprises a second cable adjustment barrel.

28. The force transfer unit according to claim 18 further comprising:

a first gear indicator disposed on the housing, wherein the first gear indicator moves in response to movement of the first control cable for indicating a gear position of a first bicycle transmission; and a second gear indicator disposed on the housing, wherein the second gear indicator moves in response to movement of the second control cable for indicating a gear position of a second bicycle transmission.

29. The force transfer unit according to claim 28 wherein the first gear indicator and the second gear indicator are together disposed behind a single viewing window.

30. The force transfer unit according to claim 28 wherein the first gear indicator has a disc shape, and wherein the second gear indicator has a disc shape.

31. A force transfer unit for engaging a control cable having an inner wire that slides within an outer casing and that is connected to a hand operated shift control unit for controlling a bicycle transmission, comprising:

a housing separate from the shift control unit and having a housing wall including a first cable passage extending through the housing wall and a second cable passage extending through the housing wall and spaced apart from the first cable passage;

a first attachment member coupled to the housing for attaching the force transfer unit to a bicycle;

a cable diverting member disposed in the housing and having a cable diverting surface for receiving the inner wire thereover to thereby bend the inner wire over the cable diverting surface as the inner wire passes over the cable diverting surface during use; and a gear indicator disposed on the housing for operatively coupling to the inner wire, wherein the gear indicator moves in response to movement of the inner wire for indicating a gear position of the bicycle transmission.

32. The force transfer unit according to claim 31 further comprising:

a first outer casing stop disposed on the housing wall; and a second outer casing stop disposed on the housing wall.

33. The force transfer unit according to claim 32 wherein the second outer casing stop comprises a cable adjustment barrel.

34. The force transfer unit according to claim 32 wherein the housing wall includes a first side wall and a second side wall opposite the first side wall, wherein the first outer casing stop is disposed on the first side wall, and wherein the second outer casing stop is disposed on the second side wall.

35. The force transfer unit according to claim 31 wherein the gear indicator indicates a gear position of a front bicycle transmission.

36. The force transfer unit according to claim 31 wherein the gear indicator indicates a gear position of a rear bicycle transmission.

37. The force transfer unit according to claim 31 wherein the gear indicator has a disc shape.

38. A force transfer unit for engaging a control cable having an inner wire that slides within an outer casing and that is connected to a hand operated shift control unit, the force transfer unit comprising:

a first attachment member for attaching the force transfer unit to a bicycle;

a mounting member coupled to the attachment member;

a first outer casing stop disposed on the mounting member;

a second outer casing stop disposed on the mounting member;

a cable diverting member disposed on the mounting member for changing a direction of the control cable, wherein the force transfer unit is separate from the shift control unit;

wherein the cable diverting member has a helically-shaped cable winding groove that extends approximately 270° around the cable diverting member; and wherein the mounting member includes a first side wall, a second side wall opposite the first side wall and an intermediate wall extending between the first side wall and the second side wall, wherein the first outer casing stop is disposed on the first side wall, and wherein the second outer casing stop is disposed on the intermediate wall.

39. The force transfer unit according to claim 38 wherein the second outer casing stop comprises a cable adjustment barrel.

40. A force transfer unit for engaging a control cable having an inner wire that slides within an outer casing and that is connected to a hand operated shift control unit, comprising:

a housing separate from the shift control unit and having a housing wall including a first cable passage extending through the housing wall and a second cable passage extending through the housing wall and spaced apart from the first cable passage;

a first attachment member coupled to the housing for attaching the force transfer unit to a bicycle;

a cable diverting member disposed in the housing for changing a direction of the control cable;

wherein the cable diverting member has a helically-shaped cable winding groove that extends approximately 270° around the cable diverting member;

a first outer casing stop disposed on the housing wall;

a second outer casing stop disposed on the housing wall; and wherein the housing wall includes a first side wall, a second side wall opposite the first side wall and an intermediate wall extending between the first side wall and the second side wall, wherein the first outer casing stop is disposed on the first side wall, and wherein the second outer casing stop is disposed on the intermediate wall.

41. The force transfer unit according to claim 40 wherein the second outer casing stop comprises a cable adjustment barrel.

42. A force transfer unit for engaging first and second control cables connected to respective first and second hand operated shift control units, wherein the first control cable has a first inner wire that slides within a first outer casing and the second control cable has a second inner wire that slides within a second outer casing, the force transfer unit including:

a housing separate from the first and second shift control units, wherein the housing has a housing wall including a first cable passage extending through the housing wall, a second cable passage extending through the housing wall, a third cable passage extending through the housing wall, and a fourth cable passage extending through the housing wall, and wherein the first cable passage and the second cable passage are spaced apart from each other;

a first cable diverting member disposed in the housing for changing a direction of the first inner wire;

a second cable diverting member disposed in the housing for changing a direction of the second inner wire; and a gear indicator operatively coupled to at least one of the first cable diverting member and the second cable diverting member for operatively coupling to at least one of the first inner wire and the second inner wire, wherein the gear indicator moves in response to movement of the at least one of the first inner wire and the second inner wire for indicating a gear position of the bicycle transmission.

43. The force transfer unit according to claim 42 further comprising:

a first outer casing stop disposed on the housing; and a second outer casing stop disposed on the housing.

44. The force transfer unit according to claim 43 further comprising a third outer casing stop disposed on the housing.

45. The force transfer unit according to claim 44 wherein the first outer casing stop is disposed on a side of the housing, and wherein the second outer casing stop is disposed on an opposite side of the housing.

46. The force transfer unit according to claim 45 wherein the third outer casing stop is oriented downwardly.

47. The force transfer unit according to claim 44 further comprising a fourth outer casing stop disposed on the housing.

48. The force transfer unit according to claim 47 wherein the first outer casing stop is disposed on a side of the housing, and wherein the second outer casing stop is disposed on an opposite side of the housing.

49. The force transfer unit according to claim 48 wherein the third outer casing stop is oriented downwardly.

50. The force transfer unit according to claim 49 wherein the fourth outer casing stop is oriented downwardly.

51. The force transfer unit according to claim 43 wherein the housing includes a first side wall and a second side wall opposite the first side wall, wherein the first outer casing stop is disposed on the first side wall, and wherein the second outer casing stop is disposed on the second side wall.

52. The force transfer unit according to claim 51 further comprising:
a third outer casing stop disposed on the housing; and
a fourth outer casing stop disposed on the housing.

53. The force transfer unit according to claim 43 wherein the housing includes a first side wall, a second side wall opposite the first side wall and an intermediate wall extending between the first side wall and the second side wall, wherein the first outer casing stop is disposed on the first side wall, and wherein the second outer casing stop is disposed on the intermediate wall.

54. The force transfer unit according to claim 53 wherein the second outer casing stop comprises a cable adjustment barrel.

55. The force transfer unit according to claim 53 further comprising:
a third outer casing stop disposed on the housing; and
a fourth outer casing stop disposed on the housing.

56. The force transfer unit according to claim 55 wherein the third outer casing stop is disposed on the second side wall, and wherein the fourth outer casing stop is disposed on the intermediate wall.

57. The force transfer unit according to claim 56 wherein the second outer casing stop comprises a first cable adjustment barrel, and wherein the fourth outer casing stop comprises a second cable adjustment barrel.

58. The force transfer unit according to claim 42 wherein the first cable diverting member is laterally spaced apart from the second cable diverting member.

59. The force transfer unit according to claim 42 wherein the first cable diverting member includes a first cable winding groove.

60. The force transfer unit according to claim 59 wherein the first cable winding groove has a substantially constant radius of curvature.

61. The force transfer unit according to claim 59 wherein the first cable winding groove has a helical shape.

62. The force transfer unit according to claim 59 wherein the first cable diverting member includes a first cable attachment location for supporting a cable end bead.

63. The force transfer unit according to claim 59 wherein the first cable diverting member includes a second cable-winding groove.

64. The force transfer unit according to claim 63 wherein the second cable winding groove has a substantially constant radius of curvature.

65. The force transfer unit according to claim 63 wherein the first cable diverting member includes a second cable attachment location for supporting a cable end bead.

66. The force transfer unit according to claim 42 wherein the first cable diverting member comprises a first pulley.

67. The force transfer unit according to claim 66 wherein the first pulley has a cable winding groove.

68. The force transfer unit according to claim 67 wherein the cable winding groove has a helical shape and extends at least 270° around the first pulley.

69. The force transfer unit according to claim 67 wherein the cable winding groove has a constant radius of curvature.

70. The force transfer unit according to claim 67 wherein the cable winding groove has a varying radius of curvature.

71. The force transfer unit according to claim 66 wherein the first pulley includes:
a first cable attachment location for attaching a first cable segment; and
a second cable attachment location for attaching a second cable segment.

72. The force transfer unit according to claim 66 wherein the first pulley includes a gear on an outer peripheral surface thereof.

73. The force transfer unit according to claim 72 wherein the gear indicator is rotatably driven by the gear.

74. The force transfer unit according to claim 66 wherein the second cable diverting member comprises a second pulley.

75. The force transfer unit according to claim 74 further comprising:
a first outer casing stop disposed on the housing; and
a second outer casing stop disposed on the housing.

76. The force transfer unit according to claim 75 further comprising a third outer casing stop disposed on the housing.

77. The force transfer unit according to claim 76 wherein the first outer casing stop is disposed on a side of the housing, and wherein the second outer casing stop is disposed on an opposite side of the housing.

78. The force transfer unit according to claim 77 wherein the third outer casing stop is oriented downwardly.

79. The force transfer unit according to claim 76 further comprising a fourth outer casing stop disposed on the housing.

80. The force transfer unit according to claim 79 wherein the first outer casing stop is disposed on a first side of the housing, and wherein the second outer casing stop is disposed on an opposite side of the housing.

81. The force transfer unit according to claim 80 wherein the third outer casing stop is oriented downwardly.

82. The force transfer unit according to claim 81 wherein the fourth outer casing stop is oriented downwardly.

83. The force transfer unit according to claim 75 wherein the housing includes a first side wall and a second side wall opposite the first side wall, wherein the first outer casing stop is disposed on the first side wall, and wherein the second outer casing stop is disposed on the second side wall.

84. The force transfer unit according to claim 83 further comprising:
a third outer casing stop disposed on the housing; and
a fourth outer casing stop disposed on the housing.

85. The force transfer unit according to claim 75 wherein the housing includes a first side wall, a second side wall opposite the first side wall and an intermediate wall extending between the first side wall and the second side wall, wherein the first outer casing stop is disposed on the first side wall, and wherein the second outer casing stop is disposed on the intermediate wall.

86. The force transfer unit according to claim 85 wherein the second outer casing stop comprises a cable adjustment barrel.

87. The force transfer unit according to claim 85 further comprising:
  a third outer casing stop disposed on the housing; and
  a fourth outer casing stop disposed on the housing.

88. The force transfer unit according to claim 87 wherein the third outer casing stop is disposed on the second side wall, and wherein the fourth outer casing stop is disposed on the intermediate wall.

89. The force transfer unit according to claim 88 wherein the second outer casing stop comprises a first cable adjustment barrel, and wherein the fourth outer casing stop comprises a second cable adjustment barrel.

90. The force transfer unit according to claim 74 wherein the first cable diverting member is laterally spaced apart from the second cable diverting member.

91. A force transfer unit for engaging first and second control cables connected to respective, first and second hand operated shift control units, wherein the first control cable has a first inner wire that slides within a first outer casing and the second control cable has a second inner wire that slides within a second outer casing, the force transfer unit including:
  a housing separate from the first and second shift control units;
  a first cable diverting member rotatably disposed in the housing for changing a direction of the first inner wire between a location where the first inner wire first engages the first cable diverting member and a location where the first inner wire exits the first cable diverting member;
  a second cable diverting member rotatably disposed in the housing for changing a direction of the second inner wire between a location where the second inner wire first engages the second cable diverting member and a location where the second inner wire exits the second cable diverting member;
  a first gear indicator operatively coupled to the first cable diverting member for moving in response to rotation of the first cable diverting member; and
  a second gear indicator operatively coupled to the second cable diverting member for moving in response to rotation of the second cable diverting member.

92. The force transfer unit according to claim 91 wherein the first cable diverting member comprises a first pulley, and wherein the second cable diverting member comprises a second pulley.

93. The force transfer unit according to claim 92 wherein the first pulley includes a first tooth gear, and wherein the first gear indicator comprises:
  a first indicator transfer gear coupled to the first tooth gear for movement in response to movement of the first tooth gear; and
  a first indicator disk coupled to the first indicator transfer gear so as to move in response to movement of the first indicator transfer gear.

94. The force transfer unit according to claim 93 wherein the first tooth gear comprises a first bevel tooth gear, and wherein the first indicator transfer gear comprises a bevel tooth gear that engages the first bevel tooth gear.

95. The force transfer unit according to claim 93 wherein the first indicator disk includes an indicating needle that cooperates with gear indicia to indicate a gear position.

96. The force transfer unit according to claim 91 wherein the first cable diverting member includes a cable winding groove having a variable radius of curvature.

97. The force transfer unit according to claim 91 wherein the first cable diverting member includes a cable winding groove having a constant radius of curvature.

98. The force transfer unit according to claim 91 wherein the housing further comprises:
  a first outer casing stop oriented in a substantially horizontal direction;
  a second outer casing stop oriented in a substantially horizontal direction;
  a third outer casing stop oriented in a substantially vertical direction; and
  a fourth outer casing stop oriented in a substantially vertical direction.

99. The force transfer unit according to claim 91 further comprising a view window disposed on the housing for covering the first gear indicator and the second gear indicator.

100. The force transfer unit according to claim 91 comprising an attachment member for attaching the force transfer unit to a bicycle.

101. A force transfer unit for engaging first and second control cables connected to respective first and second hand operated shift control units, wherein the first control cable has a first inner wire that slides within a first outer casing and the second control cable has a second inner wire that slides within a second outer casing, the force transfer unit including:
  a housing separate from the first and second shift control units;
  a first pulley including a first tooth gear rotatably disposed in the housing for changing a direction of the first inner wire;
  a second pulley rotatably disposed in the housing for changing a direction of the second inner wire;
  a first gear indicator operatively coupled to the first pulley for moving in response to rotation of the first pulley,
  a second gear indicator operatively coupled to the second pulley for moving in response to rotation of the second pulley;
  wherein the first gear indicator comprises:
    a first indicator transfer gear coupled to the first tooth gear for movement in response to movement of the first tooth gear; and
    a first indicator disk coupled to the first indicator transfer gear so as to move in response to movement of the first indicator transfer gear.

102. The force transfer unit according to claim 101 wherein the first tooth gear comprises a first bevel tooth gear, and wherein the first indicator transfer gear comprises a bevel tooth gear that engages the first bevel tooth gear.

103. The force transfer unit according to claim 101 wherein the first indicator disk includes an indicating needle that cooperates with gear indicia to indicate a gear position.

* * * * *